Oct. 24, 1967 H. W. SCHWARZ 3,348,732
ARTICLE DISPENSING DEVICE
Filed Sept. 2, 1966 6 Sheets-Sheet 1
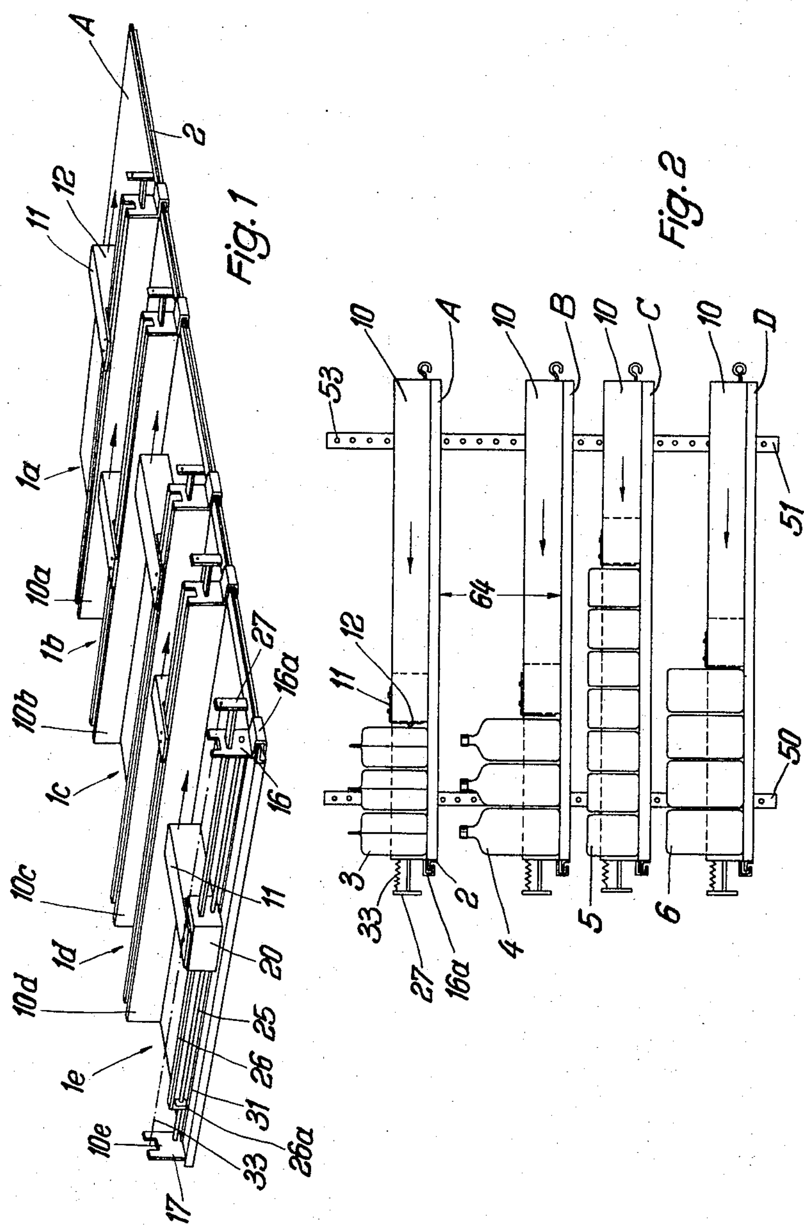
Inventor:
HEINZ WALTER SCHWARZ
By Hane and Nydick
ATTORNEYS

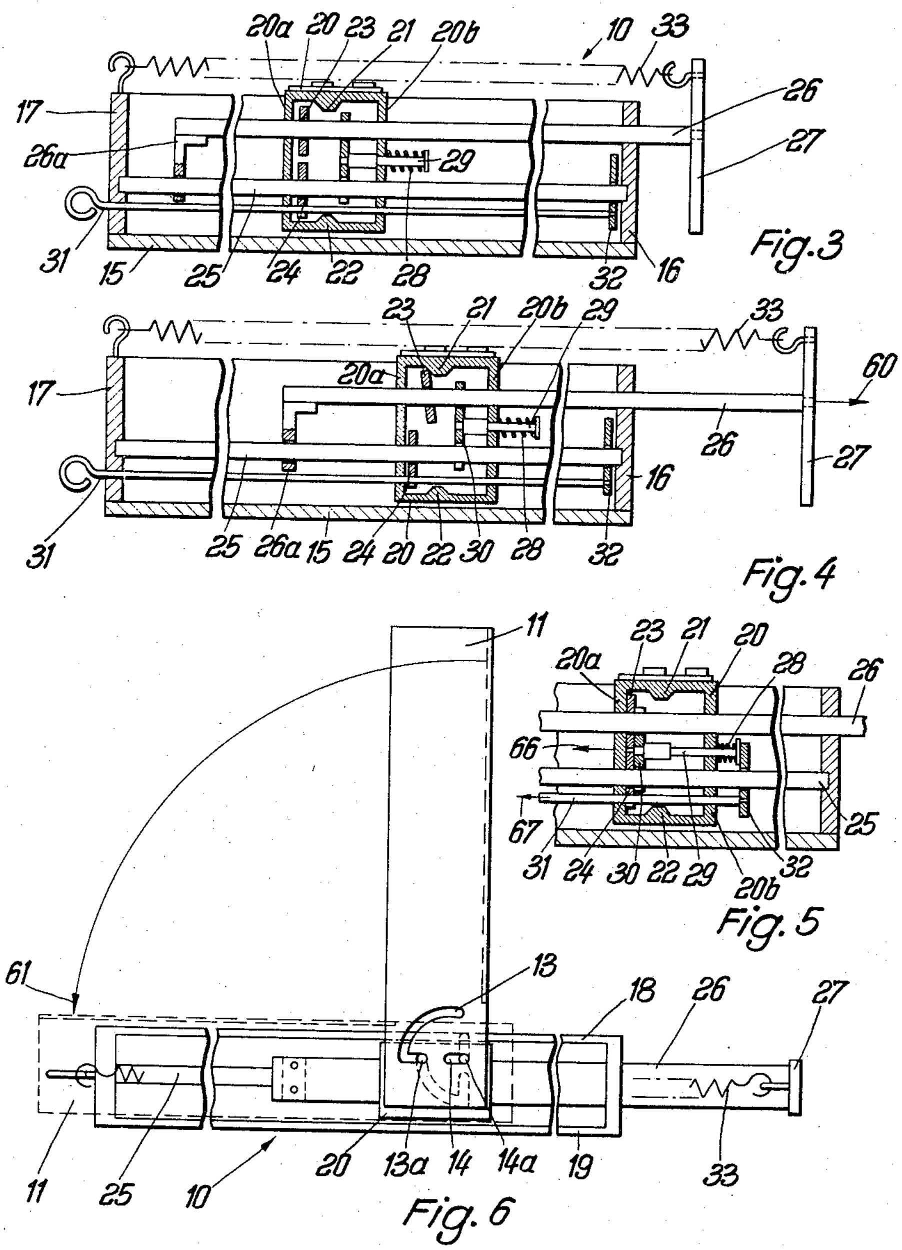
Inventor:
HEINZ WALTER SCHWARZ
BY Hane and Nydick
ATTORNEYS

Oct. 24, 1967 H. W. SCHWARZ 3,348,732

ARTICLE DISPENSING DEVICE

Filed Sept. 2, 1966 6 Sheets-Sheet 3

Inventor:
HEINZ WALTER SCHWARZ
BY Hane and Nydick
ATTORNEYS

INVENTOR.
HEINZ WALTER SCHWARZ
BY Hane and Nydick
ATTORNEYS

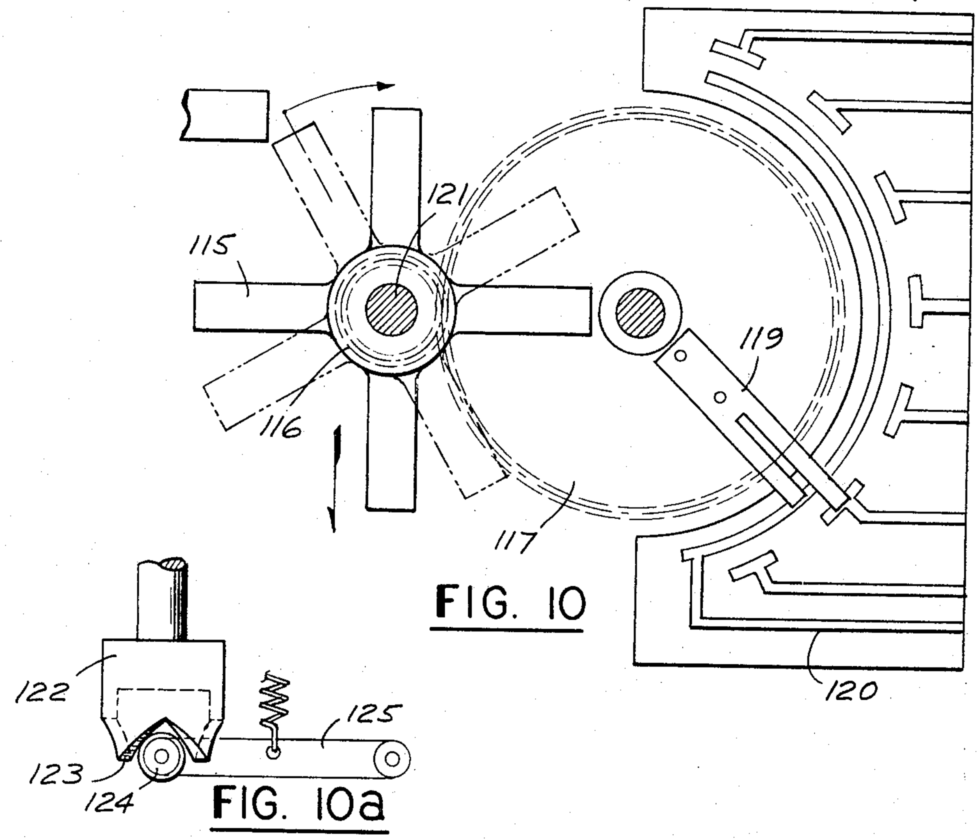
FIG. 10
FIG. 10a
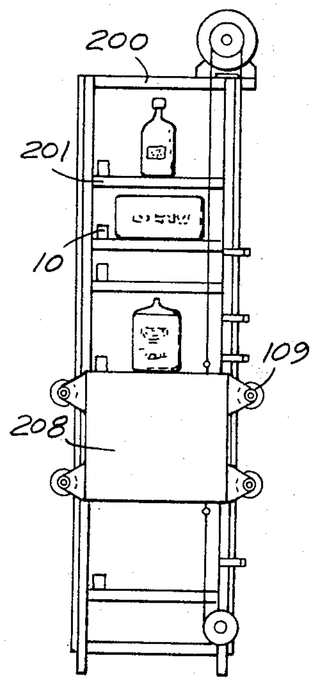
FIG. 11
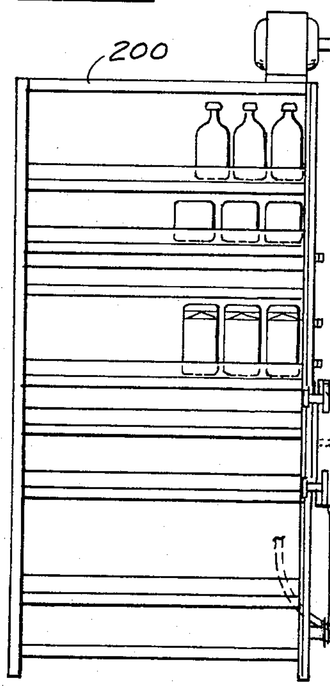
FIG. 12
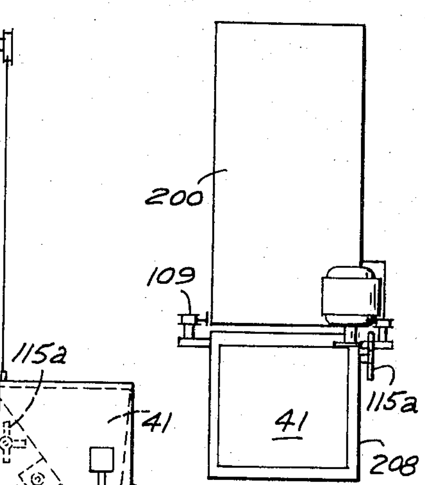
FIG. 13
INVENTOR.
HEINZ WALTER SCHWARZ
BY Hane and Nydick
ATTORNEYS INVENTOR.
HEINZ WALTER SCHWARZ
BY Hane and Nydick
ATTORNEYS United States Patent Office 3,348,732

Patented Oct. 24, 1967

3,348,732

ARTICLE DISPENSING DEVICE

Heinz Walter Schwarz, Vogelsbergweg 12, Offenbach am Main, Germany

Filed Sept. 2, 1966, Ser. No. 576,968
18 Claims. (Cl. 221—123)

The invention relates to an article dispensing device for dispensing a selected one of a plurality of articles, and more particularly to an article dispensing device or a multiple selection vending machine in which the articles are slidably disposed on one or several stationarily mounted trays or shelves and are dispensed at a common discharge station.

The present application is a continuation-in-part application based upon co-pending appplication Ser. No. 415,002, filed Dec. 1, 1964, now abandoned.

Vending machines as hereinabove referred to are used, for instance, in large self-service establishments. The conveyor for such a machine must perform a variety of functions. It must be suitable not only for conveying many different articles, either in piece form or packaged, and of different shapes and sizes, but to be economically successful, must also satisfy the following requirements:

(1) The articles should be displayed preferably erect and in a manner such that the prospective customer can visually inspect the same.

(2) The area available for the articles should be utilized as fully as possible. It must be convenient to arrange the offered articles in related groups, irrespective of differences between the articles as to type, shape or size.

(3) The conveyor should be simple, rugged and reliable. Servicing and restocking of the machine and the installation costs per unit of articles offered for selection should be minimal.

Conveyor systems for multi-selection vending machines as heretofore known do not fulfill the afore-listed requirements in a satisfactory manner.

There is known a conveying system in which different articles are placed on different conveyor bands and transported to a discharge station. Systems of this kind are very expensive, since they require a separate conveyor band and a drive therefor for each article offered for selection. Furthermore, they do not satisfy condition (1) and (2).

It is inherent in systems using such conveyor bands that for erect articles, space must be provided between each two units such that a unit next to be pushed off the conveyor band will not lose its balance when on the forward guide roller of the conveyor band. It is also impossible to obtain optimal utilization of the available total area, since conveyor bands the widths of which are adjustable are too expensive.

Other known conveyor systems which use upright or slanted frame structures for stacking articles are impractical, since not all articles can be vertically stacked. Furthermore, they do not satisfy conditions (1) and (2).

Other known systems in which the individual units of articles are placed on shelves do not permit maximum utilization of the shelves as to width and depth, even if the shelves are relatively movable either individually or jointly. Systems of this kind are known as so-called "traveling shelf systems." The utilization of the available area is particularly unfavorable when it is desirable to place the articles upright to obtain better display.

There are also known systems in which the articles are placed on horizontal stationarily mounted trays and are urged by spring pressure against a forward abutment. The selected foremost unit is then lifted above the abutment, or a diverter may be used which releases one unit each time it is actuated. In such a system each transport means requires its own drive means, in addition to diverters or other release means. The drive means, which may be a spring motor, must be so strong that it is capable of moving several comparatively heavy units of articles through a substantial distance, and such powerful spring motors are bulky.

There is further known a system in which the articles are placed on several stationary trays, and a single drive means drives a transport means which, when set for the selected tray, pushes the article from that tray. Since the transport means is fixedly secured to the drive means, a system of this kind is suitable if only one type of article is placed upon each tray.

It is a general object of the present invention to provide a conveying device which fully satisfies the afore-listed requirements and avoids the disadvantages of the systems as heretofore known.

The conveying device according to the invention utilizes the aforementioned arrangement of articles on stationary horizontal trays, but in contradistinction to the known devices, provides a separate transport means for each row of articles and a common drive means for all the transport means.

The common drive means can be operatively coupled with the selected transport means, and control means are provided which limit the transport of the articles as effected by the selected transport means in accordance with the requirements of the selected article.

Each tray may be associated with several transport means, which are displaceable in reference to the tray and the spacing of which may be adjusted in accordance with the dimensions of the articles. As a result, the available area of the trays may be fully utilized as to width and depth.

Several trays may be superimposed, spaced apart, and adjustment means may be provided for varying the effective spacing between the trays. The transport means may comprise sliders, conveyor worms, etc., which may be arranged in any suitable combination on the trays. Each transport means may push just one unit or several across one edge of the tray.

The common drive means for the transport means may be fixedly or movably arranged.

In the event the common drive means is movable relative to the transport means, it is moved into alignment with the respective selected transport means, whereby a coupling member on the drive means is placed in engagement with a corresponding coupling member on the selected transport means.

The two coupling members may be electromagnetically controlled. The driving force applied by the drive means to the respective selected transport means may be transmitted in the form of a pushing or pulling force. A substantially rectilinearly acting force is transmitted when the coupling members are mounted, for instance, on sliders. If the coupling members are mounted on a rotary shaft, the moving force will be a rotary force.

A stationarily mounted drive means may comprise a coupling member which can be selectively coupled to a coupling member on each of the transport means.

A movably mounted drive means may be equipped with a receiver in which is collected the respective pushed-forward unit. The drive means then preferably includes a drive motor which moves the receiver to the selected transport means.

The receiver may be designed in the manner of a chute into which drops a unit pushed over one edge of the tray and in which it is transported to a delivery station.

The transport may also be effected by means of conveyor bands.

Each transport means comprises a slider which reaches behind the last unit in each row. The sliders are preferably operated by means of a chain or rope pull, or a push or pull bar to which the sliders are fixedly secured.

According to a preferred embodiment of the invention, each slider is pivotally mounted on a transport linkage, which also supports one of the coupling members of the coupling and can be actuated only in the direction for moving articles toward the discharge position by the common drive means of the conveyor device. A unilaterally acting locking means is provided to assure transport in the forward direction only.

Each transport linkage comprises a transport member which supports the slider. This member is slidably guided on a track extending parallel to the respective row of articles and, in turn, guides a transport bar. The forward end of the transport bar mounts the aforementioned coupling member, and the opposite end a guide slidably engaging the track. The second coupling member is supported by the common drive means for engagement with the coupling member on any of the transport bars. The transport member may be in the form of a hollow body, preferably of substantially rectangular configuration. Two opposite inner walls of the transport member which are parallel to the transport bar and to the guide track mount lugs which coact with clamping disks when the conveyor device is actuated for moving a row of articles toward the discharge position. The clamping disks are disposed on the transport bar and the guide track, respectively, between the lugs and the rear wall of the hollow body.

The conveyor device also comprises means by which the clamping disks can be released from a locking position coupling the same with the transport bar, when it is desired to return the slider into its initial position for the purpose of refilling a depleted row of articles.

Each of the transport means may also comprise a conveyor worm which, preferably by means of a unilaterally acting locking means and a coupling member, can be driven by the drive means common for all the transport means in the forward direction only. A worm-type conveyor is preferably used when it is desired to display flat bags. Such flat bags may be inserted upright into the threads of the worm. It has been found advantageous to drive such conveyor worms by means of linkage bars or a chain or rope pull. Intermediate links, such as a rack, bevel gears, etc., may be provided to transmit the driving force from the drive means to the worm.

To assure that the transport means, when operated, displaces only one unit into a discharge position, such as pushing one unit across an edge of the tray, the distance of transport in response to one operation may be mechanically or electrically limited. For this purpose, each transport means may cooperate with an adjustable mechanical or electrical limit means. A limit switch may be provided for one or several transport means, which switch, when operated by a discharged article, disconnects or reverses the common drive means. Mechanical limit means and limit switches are preferably adjustable for different sizes or dimensions of the articles. To disconnect or reverse the common drive means, a circuit breaker may be activated when a push rod of the transport means abuts against a stop member.

The common drive means may comprise a reversible motor which operates a coupling member engageable with the coupling member of the selected transport means, preferably via a pinion and a transmission member such as a chain.

The common drive means may be mounted on a receiving receptacle for articles pushed off a tray. The receptacle may be arranged in the form of a chute which is movable into a coacting relationship with the selected row of articles by a controllable drive motor. Controllable transport assemblies of this kind are well known in the art.

The receptacle, such as a chute, may be cushioned to protect articles falling into the receptacle. Conveyor bands for conveying the selected articles may be used instead of a chute.

The limit switches may comprise stationarily or movably mounted light barriers including a photo cell and a light beam coacting therewith.

As is evident, the above referred to structural elements may be differently combined without departing from the concept of the invention.

Other objects, features and advantages of the invention will be pointed out hereinafter and set forth in the appended claims constituting part of the application.

In the accompanying drawing, preferred embodiments of the invention are shown by way of illustration, and not by way of limitation.

In the drawing:

FIG. 1 is a perspective view of a tray supporting several transport means;

FIG. 2 is a side view of several trays of the kind shown in FIG. 1 mounted in superimposition upon a frame structure;

FIG. 3 is a view, partly in section, of one of the transport means and of a unilaterally acting locking means constituting part of the transport means;

FIG. 4 is a view similar to FIG. 3, showing the transport means in a position for moving a row or articles toward a discharge position;

FIG. 5 is a view similar to FIG. 3, showing the withdrawal of a transport member of the transport means for the purpose of refilling the tray;

FIG. 6 is an enlarged view of a slider constituting part of the transport means;

Figure 7:
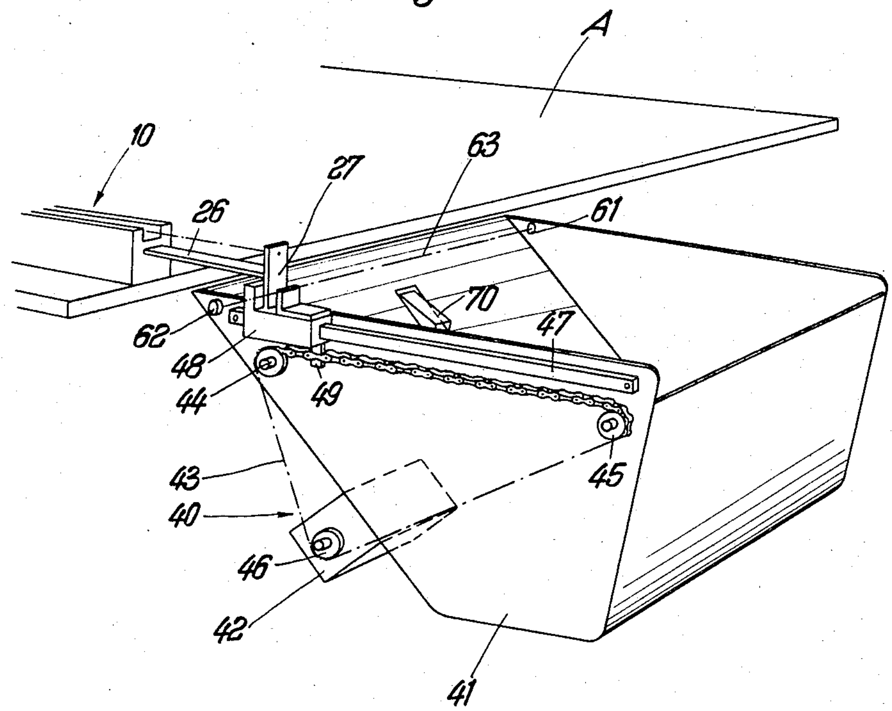
FIG. 7 is a perspective view of the common drive means of the conveyor device in combination with a receptacle for receiving discharged articles.
Figure 7A:
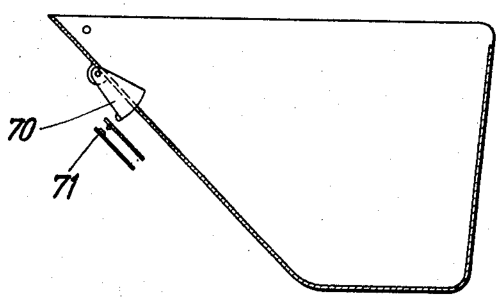
Figure 8:
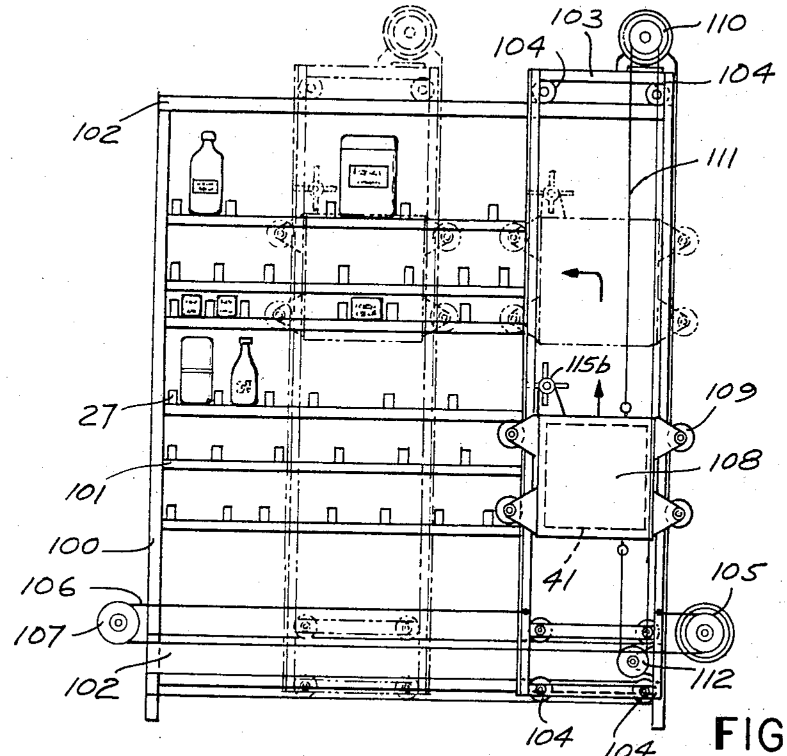
Figure 9:
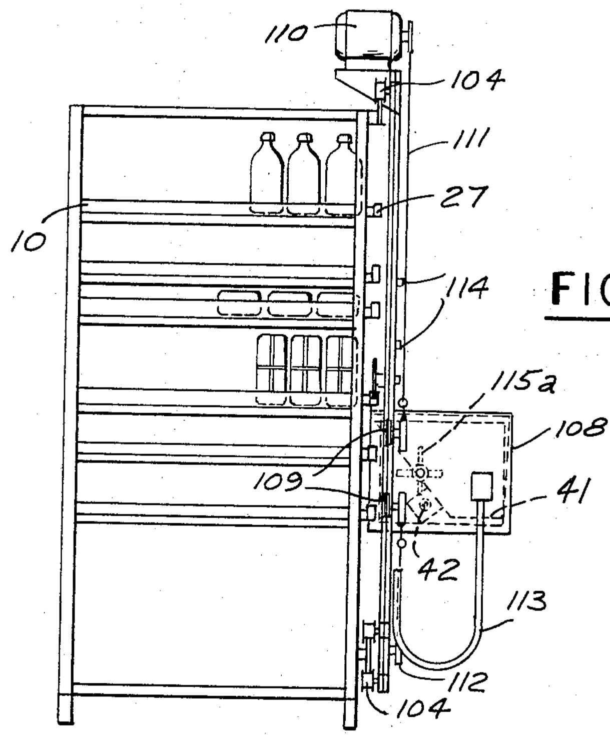

FIG. 7*a* is a diagrammatic sectional view of a modification of the receiving receptacle;

FIG. 8 is a diagrammatic elevational view of a vending machine according to the invention;

FIG. 9 is a side view of FIG. 8;

FIG. 10 is a plan view of a switching arrangement for controlling the operation of the vending machine;

FIG. 10*a* is a fragmentary side view of FIG. 10;

FIG. 11 is a diagrammatic elevational side view of a simplified vending machine according to the invention;

FIG. 12 is an elevational front view of FIG. 11;

FIG. 13 is a plan view of FIG. 11; and

Figure 14:
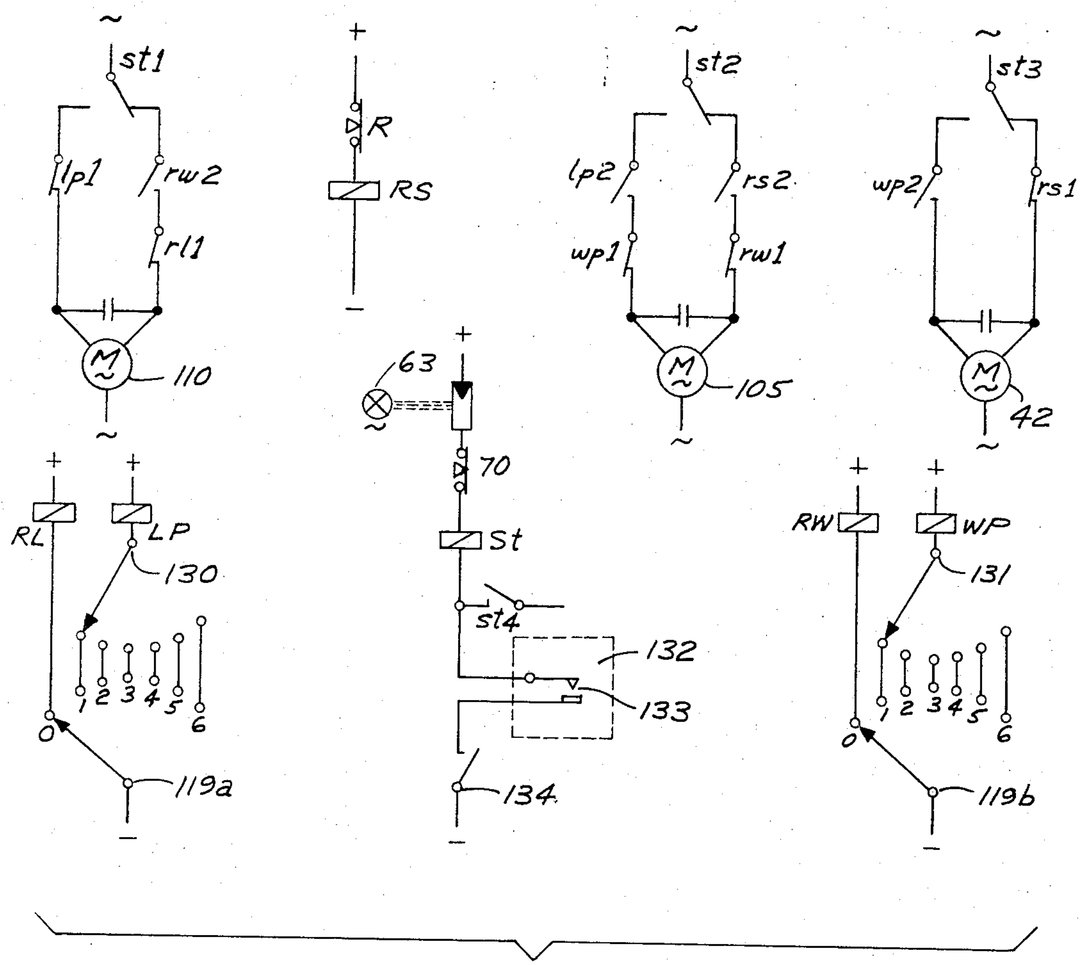

FIG. 14 is a symbolized circuit diagram of the control system for the vending machine.

Referring now to the figures in detail, FIG. 1 shows a tray A. The conveyor device may comprise any number of such trays, four trays, A through D, being shown in FIG. 2 by way of example. Each tray may consist of glass, a plastic, metal, wood or any other suitable material which may be given a sufficiently smooth surface. Each of the trays supports several transport means **10*a* to 10*e*, which are laterally displaceable on the tray so as to vary the spacings between the transport means. To secure the transport means 10 in the desired positions on the tray, suitable clamping or screw means may be provided. According to FIG. 1, a forward wall 16 of each transport means has at its lower end a generally U-shaped flange 16*a* which straddles a tongue 2 along the respective edge of the tray, as is clearly shown in FIG. 2. The rear end of each transport means 10** may mount suitable clamping, screw or catch means (not shown) for securing the transport means in the desired position. The relative spacings of the transport means on the tray are selected in accordance with the width of the specific articles to be conveyed.

The afore described positions of the transport means on the tray define slots **1*a* through 1*e* for rows of units of articles to be conveyed. As is clearly shown in FIG. 2, each row of articles may contain units 3 to 6** of different heights and widths.

According to FIG. 2, four trays are mounted on apertured mounting brackets 50 and 51 by means of support pins 53, which are inserted in selected openings in mounting brackets 50 and 51 in a conventional fashion. As is evident, the vertical spacings 64 between adjacent trays may be conveniently selected in accordance with the heights of the articles.

Each transport means comprises a slider 11 the front wall 12 of which is disposed at a right angle to the respective row of articles and reaches behind the last article in the row. As will be pointed out in greater detail hereinafter, the slider 11 is pivotally supported on a transport member 20 of the respective transport means 10. The attachment of each slider to the respective transport member 20 is so arranged that the slider can be conveniently exchanged to permit selection of a slider which is most suitable for the dimensions of the articles to be conveyed.

Each transport member 20 is disposed between the front wall 16 and a rear wall 17 of each transport means and is slidably guided on a track 25 which is fixedly secured in the front and rear wall, respectively, of the transport means.

The transport members coact with a transport bar 26, the forward end of which mounts a coupling member 27, and also with a return bar 31 by means of which the transport members may be returned into the starting position for refilling a depleted row of articles. A tensioned spring 33 may be mounted between the coupling member 27 and rear wall 17 of each transport member.

Turning now to FIGS. 3 through 6, these figures show that the walls 16 and 17 of each transport means are mounted on a base plate 15. Guide track 25 may have a round or angular cross section. Similarly, the transport bar 26 may have a round or angular cross section. As can best be seen in FIG. 7, coupling member 27 is in the form of an arm or bracket secured to the forward end of transport bar 26, for instance, by a screw connection. The rear end of bar 26 mounts an angle piece **26*a* which is slidable on track 25 to support bar 26**.

Each transport member 20 may be a hollow sleeve-shaped body of preferably rectangular cross section. The guide track 25 and the transport bar 26 extend through the front wall **20*b* and the rear wall 20*a* of body 20. Two lugs 21 and 22 protrude from the two opposite walls of body 20 which are parallel to track 25 and bar 26. Lug 21 is located adjacent bar 26, and lug 22 adjacent guide track 25. The two lugs coact with clamping disks 23 and 24, respectively. The clamping disks are tiltably seated on bar 26 and guide track 25, respectively and are disposed between the lugs and the rear wall 20*a* of body 20**. The purpose and operation of the clamping disks will be more fully explained hereinafter.

A pin 29 is slidably extended into the hollow body 20 through the front wall **20*b* thereof. The rear or inner end of pin 29 mounts a plate 30, and the forward or outer end a collar which forms an abutment for a loaded coil spring 28 disposed between the collar and the forward wall 20*b* of body 20. Pin 29 may be displaced in reference to body 20 to an extent such that plate 30 is engaged with clamping disks 23 and 24 for the purpose of placing the two disks into positions in which they are mutually parallel and abut against the inside of rear wall 20*a* of body 20**.

Pin 29 may be pressed into body 20 against the action of spring 28 by means of an arm 32 which is secured at the forward end of the return bar 31.

Turning now to FIG. 6, this figure shows the mounting of a slider 11 on a transport body 20. The transport body is shown in plan view in the figure and mounts on its top wall pins **13*a* and 14*a* which are engaged with slots 13 and 14 in a wall of slider 11. The side walls of the transport means 10 are designated by 18 and 19**.

As is evident, the respective wall portions of the slider defining the slots are pressed back against pins **13*a* and 14*a* by the resistance offered by the articles when and while the slider is displaced in the forward direction for moving the foremost article toward the discharge position. However, when the slider is manually moved forwardly in reference to pins 13*a* and 14*a*, a straight section of slots 13 and 14 permits the pins to move into positions in which they are aligned with arcuate sections of slots 13 and 14. The slider can now be tilted in the direction of the arrow 61** from the full line position, which is the operating position of the slider, into the dotted line position, in which a depleted row can be conveniently refilled.

FIG. 7 shows a common drive means 40 for the transport means. The drive means comprises a coupling member 48 which is engageable with the coupling member 27 of each of the transport means so that it can coact therewith for pushing or pulling the transport means.

Coupling member 48 is slidably guided on a track 47, which is shown as being mounted on a side wall of a receiving receptacle 41. The coupling member is so disposed that when it is placed in cooperating relationship with the coupling member 27 on any of the transport bars 26, the respective one of the rows **1*a* to 1*e*** is in alignment with the receiving receptacle.

The coupling member 48 engages a transmission means, such as a chain 43, by means of a dog 49. The chain is guided over idlers 44 and 45 and a drive pinion 46, which is directly driven by a suitable reversible motor 42.

The operation of the conveyor device, as hereinabove described, is as follows:

Let it be assumed that a customer has selected an article and completed the selection by operating an actuating member, and that as a result, the receiving receptacle has been moved by means of a drive motor along the edge of the respective one of trays A and D and has stopped in alignment with the transport means 10 containing the selected article. Suitable control and transport means for positioning receptacle 41 and the associated parts thereof in reference to the selected article will be described in connection with FIGS. 8 to 14.

When receptacle 41 is positioned as above indicated, motor 42 is automatically started. Coupling member 48 is now displaced along track 47 via chain 43 and dog 49. As a result, the coupling member carries along coupling member 27 of the selected transport means 10 in the direction of arrow 60, as is shown in FIG. 4.

At the same time, the clamping disk 23 is displaced by bar 26 within transport body 20 until it abuts against lug 21. Such abutment forces the clamping disk into the slanted position shown in FIG. 4, thus locking the disk, and with it hollow body 20, to transport bar 26. Body 20 now participates in the continued movement of the bar 26. As a result slide 11, which is secured to body 20, pushes forwardly the respective row of articles. Depending upon the arrangement of the article receiving means, the row of articles is displaced by one unit, or by only a fraction of the distance occupied by one unit. In the heretofore described embodiment, the transport means is displaced until the foremost unit is pushed over the edge of the tray and falls into receptacle 41. When falling into the receptacle, the unit interrupts the light beam 63 of a light barrier formed by a source of light 61 and a photo cell 62 responding to the beam of light. According to FIG. 7, the light barrier is arranged so that it is interrupted only by an article falling from the associated tray A.

According to FIG. 7*a*, a trap 70 is disposed in the path of a falling article. This trap when actuated operates a suitable switch 71.

The light barrier 63 and the switch 71, respectively, when operated, initiate suitable control functions, such as a reversal of motor 42.

Motor 42 when reversed displaces, via its coupling member 48, the respective coupling member 27 in the direction of the arrow 66, as is shown in FIG. 5. As a result, clamping disk 23 is released from its afore described locking position, and the transport bar 26 may be returned into its starting position, whereby such return is assisted by the tension of spring 33.

Clamping disk 24, which during the withdrawal of transport bar 26 abuts against lug 22, prevents following of transport member 20 when bar 26 is returned. Accordingly, the transport member remains in its position in which slider 11 reaches behind the last article in the respective row.

Receptacle 41 conveys the selected article to a discharge station in a well-known manner, which does not constitute part of the invention.

To replenish a depleted row of articles, the transport member 20 may be manually returned by return bar 31 into its starting position, as indicated by arrow 67 in FIG. 2. As this figure shows, plate 32 will press against the collar of pin 29. Accordingly, the pin is pressed deeper into the hollow body 20 against the action of spring 28, whereby plate 30 mounted on the pin forces the two clamping disks 23 and 24 into mutually parallel positions and also presses the two disks against the rear wall 20*a* of the transport body 20. As a result, the locking or braking action by disks 23 and 24 is released, whereby slider 11 can be freely returned into its starting position.

As previously described in connection with FIG. 6, the slider may be conveniently tilted into the dotted line position shown in FIG. 6 when it is in its starting position, so that the depleted row of articles can now be refilled.

As already indicated, any number of transport means may be provided on one tray, and any desired number of trays may be superimposed.

Referring now to FIGS. 8 and 9, the vending machine as exemplified in these figures comprises a support frame 100 supporting several shelves 101 adjustable as to height in a conventional manner. Each shelf is subdivided by transport means 10 into a plurality of slots or channels of selected width for placing therein the articles to be transported and dispensed. The arrangement of the shelves, the movement and the positioning of the articles thereon has been fully explained in connection with FIGS. 1 to 7*a*.

Support frame 100 mounts guide tracks 102 along which a transport frame 103 having rollers or coasters 104 for the purpose is slidable. The transport frame is sidewise displaceable by a motor 105 and a rope or chain 106 guided over a roller 107 and supports a carrier 108 for receptacle 41. The carrier is movable up and down on the transport frame by means of rollers 109. The drive for the up and down movement of the carrier on frame 103 is derived from a lift motor 110 by means of a rope or chain 111 guided over a roller 112. Power is supplied to the motor by a flexible and movable cable 113.

The transport frame mounts switching lugs 114 which are adjustable in accordance with the setting of shelves 101, one being provided for each shelf, and operate a switching cross 115*a* when and while carrier 108 is moved upwardly or downwardly. A second switching cross 115*b* also mounted on carrier 108 is actuated by coupling members 27 of transport means 10 when the carrier and frame 103 are moved sidewise in reference to support frame 100.

As can best be seen in FIGS. 10 and 10*a* in which the switching crosses are generally designated by 115, each switching cross rotates via a shaft 121 and a gear 116 secured thereon a gear 117 mounting a switch arm 119 (reference to switch arms 119*a* and 119*b* is made hereinafter for sake of clarity). Each actuation of switching cross 115 steps switch arm 119 along contact elements 120 by one step.

As is shown in FIG. 10*a* shaft 121 mounts at one end a notched wheel 122. Notches 123 in this wheel are engageable with a roller 124 on a spring loaded latch arm 125 whereby the switching cross is retained in a selected rest position.

Carrier 108 further suports reversible motor 42 and light barrier assembly 61, 62, 63 or trap 70 operating switch 71 (see FIGS. 7 and 7*a*). After carrier 108 has been positioned in reference to the selected article slot or channel, motor 42 actuates the respective transport means 10 until the foremost article is pushed across the edge of its shelf 101 as described in connection with FIGS. 1 to 7*a* whereby the light barrier or trap 70 is operated as previously described.

The selected article now falls either directly into a stationarily mounted receptacle arranged in a conventional manner below support frame 100 or preferably, it falls into receptacle 41 and is then transported to a delivery station for articles when carrier 108 is returned to its starting position.

The positioning and the return of carrier 108 are controlled in accordance with the circuitry of FIG. 14.

A rotary switch 130 of conventional design for the number assigned to the selected shelf and a second rotary switch 130 for the number of the slot or channel in which the selected article is located, are first manually set. The customer then drops an appropriate coin or token into a suitable and conventional coin operated device 132 thereby closing a credit contact 133 therein. Finally, the customer operates a starter button 134 thereby energizing a relay S*t*. As a result, the relay starts via contacts *st*1 and *lp*1 lift motor 110 in the direction for lifting carrier 108. As the carrier passes each shelf, switching cross 115*a* for switch arm 119*a* is operated by switching lugs 114 whereby arm 119*a* is each time stepped by one position. When carrier 108 reaches the shelf for which rotary switch 130 is set, relay LP is energized. Contact *lp*1 of this relay disconnects lift motor 110. This motor is preferably equipped with a conventional brake which becomes effective when the motor is stopped so that carrier 108 is arrested at the selected shelf. At the same time contact *lp*2 of relay LP connects motor 105 for the transport frame and this frame now is driven toward the left together with carrier 108. During such sidewise displacement this passing of each transport means 10 operates switching cross 115*b* thereby stepping switch arm 119*b* each time along contact elements 120 by one position. When the stepping position on contact elements 120 is reached for which rotary switch 131 is set, relay WP is energized and its contact *wp*1 disconnects motor 105 for the transport frame. Motor 105 is preferably also equipped with a conventional brake which becomes effective when the motor is stopped so that the transport frame is arrested and retained in its position immediately after the disconnection of motor 105.

Relay WP when energized also connects transport motor 42 via its contact *wp*2 and the respective transport means 10 pushes the respective row of articles forward until the foremost article is pushed over the edge of the respective shelf thereby operating the light barrier or the trap 70. The energizing circuit of relay S*t* is hence interrupted and its contact *st*3 connects motor 42 for drive in the reverse direction. Motor 42 now returns the respective transport means 10 into the original position and when the same is reached a limit switch R is actuated. As a result, a relay RS is energized. Relay contact *rs*1 now disconnects transport motor 42 while relay contact *rs*2 connects motor 105 of the transport frame for the return drive. During the return of the transport frame, switch arm 119*b* is returned by means of switching cross 115*b* to its 0 position in which relay RW is energized. Contact *rw*1 of this relay now disconnects motor 105 and relay contact *rw*2 energizes lift motor 110 for drive in the reverse direction. Accordingly, carrier 108 is now lowered whereby switch arm 119*a* is returned into its 0 position by means of switching cross 115*a*. Switch arm 119*a* in its 0 position energizes relay RL and contact *rl*1 disconnects lift motor 110. Accordingly, carrier 108 is again in its starting position.

FIGS. 11, 12 and 13 show a simplified vending machine exemplifying the concept of the invention. The vending machine according to these figures comprises a support 200 supporting shelves 201 adjustable as to height in a conventional manner. Each of the shelves supports a single transport means 10 of the kind previously described. Accordingly, each of the shelves can accommodate only one row of articles so that the laterally displaceable transport frame 103 as shown in FIGS. 8 and 9 and the associated control circuitry are not necessary. The positioning of carrier 208 as to height and the release of articles by pushing the transport means forward on the respective shelves are effected as described in connection with the preceding figures.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An article dispensing device comprising in combination:

(a) several horizontally mounted trays disposed in a superimposed spaced-apart relationship for placing on each tray a row of articles to be dispensed one by one;

(b) a transport means on each tray for displacing the respective row of articles through a distance such that the respective foremost article in said row is pushed over an edge of the respective tray;

(c) first drive means common to said transport means;

(d) coupling means for coupling said first drive means with the transport means of a selected one of said trays;

(e) a movably mounted common receiving means for receiving the article pushed over said edge of any of the trays;

(f) conveying means coupled with said receiving means for moving the same into a receiving relationship with said edge of the selected tray;

(g) second drive means for driving said conveying means to move said receiving means up and down relative to said edge of the trays; and (h) control means for controlling said coupling means to couple the transport means on a selected tray to the first drive means for the purpose aforesaid and for controlling the second drive means to activate said conveying means for moving the receiving means into a receiving relationship with the selected tray.

2. An article dispensing device comprising in combination:

(a) several horizontally mounted trays disposed in superimposed spaced-apart relationship for placing on each of said trays several parallel rows of articles to be dispensed one by one;

(b) a transport means on each tray for each row thereon for displacing a selected one of said rows for a distance such that the foremost article in the selected row is pushed over an edge of the respective tray;

(c) a first drive means common to said transport means;

(d) coupling means for coupling said first drive means with the transport means for the selected row on a selected tray;

(e) a movably mounted common receiving means for receiving the article pushed over said edge of the tray having the selected row thereon;

(f) first conveying means arranged to be coupled with said receiving means for moving the same up and down in reference to said edges of the superimposed trays;

(g) second conveying means arranged to be coupled wtih said receiving means for moving the same into alignment with a selected row on a tray;

(h) first control means for controlling said coupling means to couple said drive means with the transport means associated with the selected one of said rows; and (i) second control means for controlling said first conveying means to move said receiving means into a position level with the respective edge of the tray having the selected row thereon and said second conveying means to move said receiving means into receiving alignment with the selected row on the respective tray.

3. An article dispensing device according to claim 2 wherein said second control means comprise first multi-position switch means, each of the switching positions of said switch means corresponding to the level of one of said trays and being connected in an energizing circuit with said first conveying means to actuate the same for movement of the receiving means to the level of the respective tray; second multiple switch means, each of the switching positions of said second switch means corresponding to one of the rows on the trays and being connected in an energizing circuit with said second conveying means to move the receiving means into alignment with the respective row; and actuating means for setting the first and second switch means to selected ones of said switching positions for the purpose aforesaid.

4. An article dispensing device according to claim 3 wherein each of said multiple switch means comprise a plurality of fixed contact elements and a movable switch element sequentially movable into engagement with said fixed contact elements, said fixed contact elements being selectively connectable in circuit with said first and second conveying means respectively, the movable contact element of each switch means being controlled by the respective conveying means so that passage of a tray by the first conveying means while said conveying means is moving causes a one step movement of the respective movable element along the associated fixed contact elements and passage of a row by the second conveying means while the said conveying means is moving causes a one step movement of the respective movable element along the associated fixed contact elements, engagement of either one of the movable contact elements with the respective selected fixed contact element causing a stoppage of the respective conveying means.

5. An article dispensing device according to claim 4 wherein the movable contact elements of both said switch means are movably mounted on said receiving means, and wherein an actuating element is secured adjacent to each tray and to each row on each tray, each of said actuating elements being engageable with the respective movable element as said receiving means is moved past the trays and the rows thereon by the conveying means, said engagement moving the respective contact elements step by step along said fixed contact elements.

6. A device according to claim 2, wherein each of said transport means comprises a slider extending behind the last article in the respective row for displacing the entire row as an entity, and a slider transport linkage supporting said slider, said coupling means including a coupling member on each of said linkages and a coupling member mounted on said common first drive means, and a unilaterally acting locking means for each of said linkages, each of said locking means being engageable with the respective linkage to couple the coupling member thereof with the coupling member on the first drive means for displacing the respective row toward the position pushing the foremost article over the edge of the respective tray.

7. A device according to claim 6, wherein each of said slider transport linkages comprises a transport member supporting the respective slider, a guide track mounted on the respective tray parallel to the respective row thereon and slidably supporting said transport member, and a transport bar slidably guided through said transport member, one end of said bar mounting a support element guided by said track and the other end mounting the coupling member of the respective coupling means.

8. A device according to claim 7, wherein said transport member comprises a housing of substantially rectangular cross section, two opposite sides of said housing being parallel to said track and said bar and having internally protruding lugs adjacent to the track and the bar, respectively, and wherein clamping means are releasably seated within said housing on said track and said bar, respectively, between said lugs and the rear wall of said housing as seen in the direction of the displacement of the row toward said position for discharging the foremost article, said clamping means coacting with said track and said transport bar for releasably coupling said housing to said transport bar.

9. A device according to claim 8, wherein a spring-loaded release member is slidably extended into said housing through the front wall thereof, the end of said release member within the housing mounting an arm coacting with said clamping means for moving the latter into a release position when the release member is pushed deeper into the housing against the action of said spring loading.

10. A device according to claim 9, wherein a return bar for retracting said housing into an initial position is slidably extended through said housing, said return bar having at its end outwardly protruding from the rear wall of the housing a laterally extending arm engageable with said release member, whereby when said return bar is pulled back in reference to said front wall of the housing, said arm pulls the release member deeper into the housing for the purpose aforesad.

11. A device according to claim 10, wherein a loaded spring is provided between said rear wall of the housing and the coupling member mounted on the support member.

12. A device according to claim 2, wherein each of said transport means comprises a setting means to set the respective transport means for a selected distance of displacement of the respective row.

13. A device according to claim 2, wherein at least one limit switch is provided for each of said transport means, each of said limit switches being actuated by the foremost article in the respective row reaching the receiving means and operating said common first drive means for arresting further displacement of the selected row of articles.

14. A device according to claim 13, wherein each of said limit switches comprises a light barrier including a light beam and a photo cell.

15. A device according to claim 2, wherein said common first drive means comprises a reversible motor, and wherein a pinion and a transmission means couple said motor to a selected one of said transport means via said coupling means.

16. A conveying device according to claim 2, wherein said transport means mounted on each of said trays are parallel one to another and transversely slidable to vary the distances between said rows on the trays.

17. A conveying device according to claim 2, wherein each of said transport means comprises bent-over wall portions which straddle an edge of the respective tray to retain said transport means in position.

18. A conveying device according to claim 2, wherein each of said transport means comprises fastening means for securing the transport means on the respective tray.

References Cited

UNITED STATES PATENTS

| | | | |
|---|---|---|---|
| 2,253,447 | 8/1941 | Stanford | 221—123 X |
| 3,237,745 | 3/1966 | Gerhart et al. | 221—129 X |

STANLEY H. TOLLBERG, *Primary Examiner.*